US012804323B2

(12) United States Patent
Tian et al.

(10) Patent No.: US 12,804,323 B2
(45) Date of Patent: Nov. 17, 2026

(54) AUDIO PROCESSING DEVICE AND METHOD

(71) Applicant: Shenzhen Shokz Co., Ltd., Shenzhen (CN)

(72) Inventors: Qingyuan Tian, Shenzhen (CN); Liang Wang, Shenzhen (CN); Jingbo Qiu, Shenzhen (CN); Fanrong Zeng, Shenzhen (CN)

(73) Assignee: Shenzhen Shokz Co., Ltd., Shenzhen (CN)

( * ) Notice: Subject to any disclaimer, the term of this patent is extended or adjusted under 35 U.S.C. 154(b) by 193 days.

(21) Appl. No.: 18/885,715

(22) Filed: Sep. 15, 2024

(65) Prior Publication Data

US 2025/0008268 A1 Jan. 2, 2025

Related U.S. Application Data

(63) Continuation of application No. PCT/CN2022/128860, filed on Nov. 1, 2022.

(51) Int. Cl.
*H04R 3/12* (2006.01)
*H04R 1/24* (2006.01)

(52) U.S. Cl.
CPC ................ *H04R 3/12* (2013.01); *H04R 1/24* (2013.01)

(58) Field of Classification Search
CPC ... H04R 3/12; H04R 1/24; H04R 1/26; H04R 5/02; H04R 9/063
See application file for complete search history.

(56) References Cited

U.S. PATENT DOCUMENTS

2018/0352365 A1 12/2018 Ingebritsen

FOREIGN PATENT DOCUMENTS

| | | | | |
|---|---|---|---|---|
| CN | 103974167 A | | 8/2014 | |
| CN | 108632714 A | | 10/2018 | |
| CN | 113507633 A | | 10/2021 | |
| CN | 115250397 A | * | 10/2022 | ........... H04R 1/1083 |

OTHER PUBLICATIONS

International Search Report of PCT/CN2022/128860 (Feb. 25, 2024).

* cited by examiner

*Primary Examiner* — Sunita Joshi
(74) *Attorney, Agent, or Firm* — Fideli Law PLLC; Qiang Li

(57) ABSTRACT

The audio processing device and method provided in the present disclosure include an audio processing device that includes a sound-producing module and an audio processing circuit. The sound-producing module includes K sound-producing units, each with different audio characteristics, where K is an integer greater than one. After obtaining the initial audio data, the audio processing circuit converts the initial audio data into K-channel target audio data, with each channel's target audio data adapted to the audio characteristics of the corresponding sound-producing unit. The K-channel target audio data is then input into the corresponding K sound-producing units, where each sound-producing unit converts the corresponding target audio data into the target audio, thereby forming reverberated sound. This approach enhances the audio quality of the audio processing.

18 Claims, 9 Drawing Sheets

AUDIO PROCESSING DEVICE AND METHOD

RELATED APPLICATIONS

This application is a continuation application of PCT application No. PCT/CN2022/128860, filed on Nov. 1, 2022 and the content of which is incorporated herein by reference in its entirety.

TECHNICAL FIELD

The present disclosure relates to the field of audio processing, and in particular to an audio processing device and method.

BACKGROUND

With the increasing intelligence of audio playback, users have higher demands for the sound quality of audio. In audio playback, using multiple sound-producing units, such as bass, midrange, and treble, is a solution to meet high sound quality requirements. When using multiple sound-producing units to play audio, the existing audio processing method involves directly sending single-channel audio data to multiple sound-producing units for playback.

Through research and practice in the existing technology, the inventors of this disclosure have discovered that since different sound-producing units have different audio characteristics, directly playing the same audio data on different sound-producing units such as bass, midrange, and treble cannot achieve the best playback effect for each sound-producing unit during playback, thereby affecting the sound quality effect during playback. Consequently, this leads to poor sound quality in audio processing.

Therefore, there is a need to provide audio processing equipment and methods that offer better sound quality.

SUMMARY

The present disclosure provides an audio processing device and method with better sound quality.

According to a first aspect of the present disclosure, an audio processing device is provided, including: a sound-producing module, including K sound-producing units, each having different audio characteristics, where K is an integer greater than one; and an audio processing circuit, configured to: obtain initial audio data, convert the initial audio data into K-channel target audio data, with each channel's target audio data adapted to audio characteristics of the corresponding sound-producing unit, and input the K-channel target audio data into the corresponding K sound-producing units, causing each sound-producing unit to convert the corresponding target audio data into target audio, forming reverberated sound.

According to a second aspect of the present disclosure, an audio processing method for a headset is provided, including, by the audio processing circuit of the headset: obtaining initial audio data; converting the initial audio data into K-channel target audio data, with each channel's target audio data adapted to audio characteristics of one of the corresponding K sound-producing units within the headset, where K is an integer greater than one, and each sound-producing unit has different audio characteristics; and inputting the K-channel target audio data into the corresponding K sound-producing units, so that the K sound-producing units output reverberated sound.

From the above technical scheme, it can be seen that the audio processing device provided in the present disclosure includes a sound module and an audio processing circuit, where the sound module includes K sound units, each sound unit has different audio characteristics, and K is an integer greater than 1; after obtaining the initial audio data, the audio processing circuit converts the initial audio data into target audio data of K channels, the target audio data of each channel is adapted to the audio characteristics of the corresponding sound unit, and the target audio data of the K channels are respectively input to the corresponding K sound units, so that each sound unit converts the corresponding target audio data into target audio to form a reverberation sound; because the scheme can convert the initial audio data into target audio data of K channels through the audio processing circuit and input them to the corresponding K sound units respectively, and the target audio data of each channel is adapted to the audio characteristics of the corresponding sound unit, so as to ensure that the sound emitted by each sound unit in the sound module has the best sound effect, so the sound quality effect of audio processing can be improved.

The audio processing method and system provided in this disclosure convert the initial audio data into target audio data of K channels after acquiring the initial audio data, and the target audio data of each channel is adapted to the audio characteristics of the corresponding sound unit, where K is an integer greater than 1; and the target audio data of the K channels are respectively input into the corresponding K sound units, so that the K sound units output reverberated sound, where the audio characteristics of each sound unit are different; since the scheme can convert the initial audio data into target audio data of K channels, and then input the target audio data of K channels into the corresponding K sound units respectively, and the target audio data of each channel is adapted to the audio characteristics of the corresponding sound unit, it is ensured that the sound emitted by each sound unit in the sound module has the best sound effect, so the sound quality effect of the audio processing can be improved.

Other functions of the audio processing device and method provided in this disclosure will be partially listed in the following description. According to the description, the contents introduced by the following numbers and examples will be obvious to those of ordinary technicians in the field. The creative aspects of the audio processing device and method provided in this disclosure can be fully explained by practice or using the methods, devices and combinations described in the following detailed examples.

BRIEF DESCRIPTION OF THE DRAWINGS

To more clearly explain the technical solutions in the exemplary embodiments of the present disclosure, the following is a brief introduction to the drawings used in the descriptions of the exemplary embodiments. It is evident that the drawings described below are merely some exemplary embodiments of the present disclosure. For those skilled in the art, other drawings can be obtained based on these drawings without creative effort.

DETAILED DESCRIPTION

Figure 1:
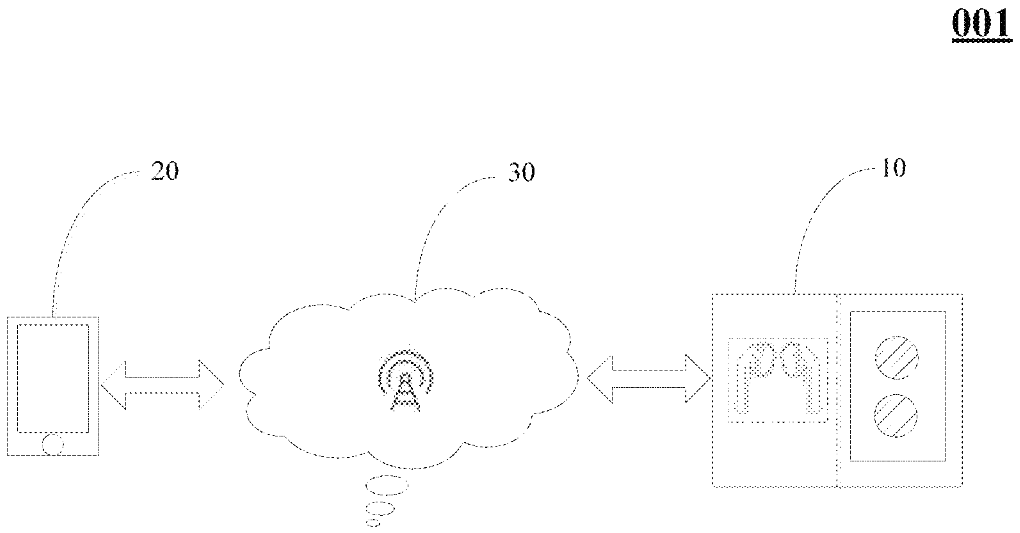
FIG. 1 illustrates a schematic diagram of an application scenario of an audio processing device according to exemplary embodiments of the present disclosure.

The following description provides specific application scenarios and requirements of the present disclosure, aiming to enable those skilled in the art to make and use the content described herein. Various local modifications to the disclosed exemplary embodiments will be apparent to those skilled in the art, and the general principles defined herein may be applied to other exemplary embodiments and applications without departing from the spirit and scope of the present disclosure. Therefore, the present disclosure is not limited to the exemplary embodiments shown but should be interpreted in the broadest scope consistent with the claims.

The terminology used herein is for the purpose of describing particular exemplary embodiments and is not intended to be limiting. For example, unless explicitly stated otherwise in the context, the singular forms "a," "an," and "the" as used herein are intended to include plural forms as well. When used in the present disclosure, the terms "comprises," "comprising," and/or "containing" indicate the presence of the stated features, steps, operations, elements, and/or components, but do not preclude the presence or addition of one or more other features, integers, steps, operations, elements, components, and/or groups in the system/method.

In light of the following description, the features and other characteristics of the present disclosure, as well as the operation and function of related structural elements, and the economy of combination and manufacture of components, can be significantly improved. Reference to the drawings, all of the contents in the drawings form part of the present disclosure. However, it should be clearly understood that the drawings are only for the purpose of illustration and description and are not intended to limit the scope of the present disclosure. It should also be understood that the drawings are not drawn to scale.

The flowcharts used in the present disclosure illustrate operations implemented according to some exemplary embodiments of the present disclosure. It should be clearly understood that the operations in the flowcharts may be performed out of the order mentioned. Instead, the operations may be performed in reverse order or simultaneously. Additionally, one or more other operations may be added to the flowchart. One or more operations may be removed from the flowchart.

Before describing specific exemplary embodiments of the present disclosure, the application scenarios of the present disclosure are introduced as follows.

The present disclosure relates to the application scenarios of audio processing devices. An exemplary application scenario is as follows: After obtaining the initial audio data output by a target device, the audio processing device processes the initial audio data and plays the target audio corresponding to the processed audio data through a sound-producing module, thereby forming reverberated sound.

FIG. 1 illustrates a schematic diagram of an application scenario of an audio processing device according to exemplary embodiments of the present disclosure. As shown in FIG. 1, application scenario 001 may include an audio processing device 10, a target device 20, and a network 30.

The audio processing device 10 may include a sound-producing module 100 and an audio processing circuit 200. In some exemplary embodiments, the audio processing circuit 200 may obtain initial audio data from the target device 20, process the initial audio data, and send the processed target audio data to the sound-producing module 100 for sound production, thereby forming reverberated sound. In some exemplary embodiments, the audio processing device 10 may store data or instructions for executing the audio processing method described in the present disclosure and may execute or be used to execute the data or instructions. In some exemplary embodiments, the audio processing device 10 may include hardware devices with data information processing capabilities and the necessary programs to drive the operation of such hardware devices. For example, the audio processing device 10 could be a headset, a large home or commercial audio system, etc. The aforementioned audio processing method will be introduced in the subsequent content of this document.

The target device 20 may be an electronic device with audio data output capabilities. In some exemplary embodiments, the target device 20 may include mobile devices, tablets, laptops, built-in devices in motor vehicles, or similar devices, or any combination thereof. In some exemplary embodiments, the mobile device may include smart home devices, smart mobile devices, virtual reality devices, augmented reality devices, or similar devices, or any combination thereof. In some exemplary embodiments, the smart home device may include smart TVs, desktop computers, smart speakers, etc., or any combination thereof. In some exemplary embodiments, the smart mobile device may include smartphones, personal digital assistants, gaming devices, navigation devices, etc., or any combination thereof. In some exemplary embodiments, the virtual reality or augmented reality devices may include virtual reality headsets, virtual reality glasses, virtual reality controllers, augmented reality headsets, augmented reality glasses, augmented reality controllers, or similar devices, or any combination thereof. For example, the virtual reality or augmented reality devices may include Google Glass, head-mounted displays, VR devices, etc. In some exemplary embodiments, the built-in device in the motor vehicle may include an in-car computer, in-car TV, etc. In some exemplary embodiments, the target device 20 may include an audio collection device for collecting audio data within a target space to obtain the initial audio data. In some exemplary embodiments, the target device 20 may also receive initial audio data from other devices.

In some exemplary embodiments, the target device 20 may have one or more applications (APPs) installed. These APPs can provide users with the capability and interface for interacting with external environments. The APPs include, but are not limited to, web browser-type APPs, search-type APPs, chat-type APPs, shopping-type APPs, video-type APPs, financial management-type APPs, instant messaging tools, email clients, social platform software, etc. In some exemplary embodiments, a target APP may be installed on the target device 20. The target APP can generate or obtain initial audio data, or it can receive initial audio data from other devices.

The network 30 serves as a communication medium, providing a connection between the audio processing device 10 and the target device 20. The network 30 can facilitate the exchange of information or data. As shown in FIG. 1, the audio processing device 10 and the target device 20 can connect with the network 30 and transmit information or data to each other through the network 30. In some exemplary embodiments, the network 30 can be any type of wireless network. For example, the network 30 may include telecommunications networks, intranets, the Internet, local area networks (LANs), wide area networks (WANs), wireless LANs (WLANs), metropolitan area networks (MANs), public switched telephone networks (PSTNs), Bluetooth™ networks, ZigBee™ networks, near-field communication (NFC) networks, or similar networks. For instance, if the network 30 is a Bluetooth™ network, the audio processing device 10 may be an audio processing device that supports the Bluetooth™ protocol; the target device 20 may be an audio data output device that supports the Bluetooth™ protocol. The audio processing device 10 can communicate with the target device 20 based on the Bluetooth™ protocol. In some exemplary embodiments, the audio processing device 10 may also transmit data to the target device 20 through a wired network or a local area network.

It should be understood that the number of audio processing devices 10, target devices 20, and networks 30 in FIG. 1 is merely illustrative. Depending on implementation needs, there can be any number of audio processing devices 10, target devices 20, and networks 30.

Figure 2:
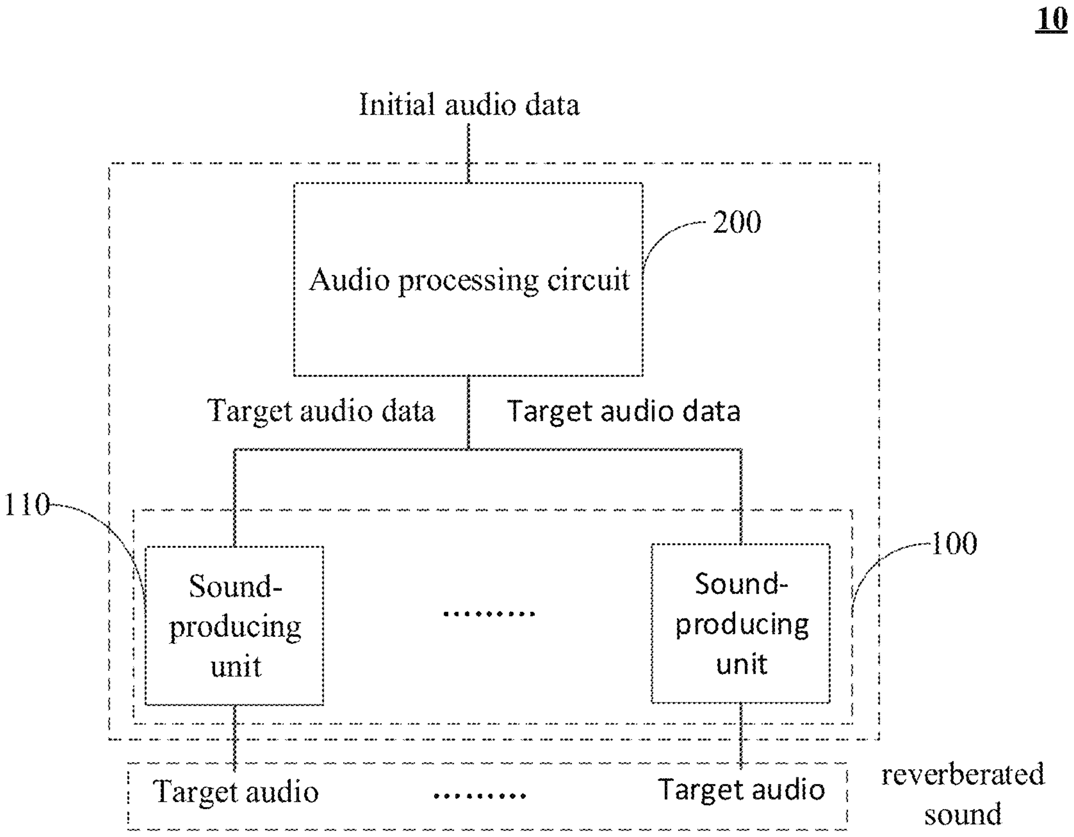
FIG. 2 illustrates a hardware structure diagram of an audio processing device according to exemplary embodiments of the present disclosure.

FIG. 2 illustrates a hardware structure diagram of an audio processing device 10 provided according to some exemplary embodiments of the present disclosure. As shown in FIG. 2, the audio processing device 10 may include a sound-producing module 100 and an audio processing circuit 200.

In some exemplary embodiments, the sound-producing module 100 may include K sound-producing units 110, where K is an integer greater than 1, and each sound-producing unit 110 has different audio characteristics. The sound-producing unit 110 may include one or more devices capable of producing sound, such as one or more various types of speakers. Different speakers may have different audio characteristics. The audio characteristics can be understood as producing different sound effects for the same audio signal; in other words, different sound-producing units 110 have different frequency response functions for the same frequency band of audio signals, resulting in different sound quality effects. For example, some sound-producing units 110 may have audio characteristics that provide better fidelity for mid-frequency audio data and/or produce a thicker and/or more butter-like sound quality; other sound-producing units may have audio characteristics that offer better fidelity for high-frequency audio data and/or can produce a pure and clear sound quality. For instance, when the sound-producing units 110 include bone conduction sound-producing units and air conduction sound-producing units, the bone conduction sound-producing units may offer better sound effects for mid and high frequencies, while the air conduction sound-producing units may provide better sound effects for low-frequency audio. For human ears, low frequency may refer to a frequency range of approximately 20 Hz to 150 Hz, mid-frequency may refer to a frequency range of approximately 150 Hz to 5 KHz, and high frequency may refer to a frequency range of approximately 5 KHz to 20 KHz. Mid-low frequency may refer to a frequency range of approximately 150 Hz to 500 Hz, and mid-high frequency may refer to a frequency range of 500 Hz to 5 KHz. Those skilled in the art will understand that the distinction of these frequency ranges is given as an example with approximate intervals. The definitions of these frequency ranges may vary with different industries, application scenarios, and classification standards. For example, in other application scenarios, low frequency may refer to a frequency range of approximately 20 Hz to 80 Hz, mid-low frequency may refer to a frequency range of approximately 80 Hz to 160 Hz, mid-frequency may refer to a frequency range of approximately 160 Hz to 1280 Hz, mid-high frequency may refer to a frequency range of approximately 1280 Hz to 2560 Hz, and high frequency may refer to a frequency range of approximately 2560 Hz to 20 KHz.

The audio processing circuit 200 is configured to obtain the initial audio data and convert it into K-channel target audio data, with each channel of target audio data adapted to the audio characteristics of the corresponding sound-producing unit 110. For example, if the audio characteristics of the sound-producing unit 110 are such that it produces a clear sound quality in the high-frequency range but performs ordinarily in the mid and low-frequency ranges, then the target audio data for the corresponding channel of that sound-producing unit 110 will contain more high-frequency audio data, while the amount of mid and low-frequency audio data will be reduced or even absent. After converting the initial audio data, the audio processing circuit 200 can input the K-channel target audio data into the corresponding K sound-producing units so that each sound-producing unit converts the corresponding target audio data into the target audio, forming reverberated sound.

The initial audio data may be digitized audio data for one or more channels. This initial audio data may include Pulse Code Modulation (PCM) audio data or other types of digitized audio data. Take the initial audio data being PCM audio data as an example, the initial audio data may be a binary sequence directly formed by converting an analog signal into digital form. There are various ways for the audio processing circuit 200 to obtain the initial audio data; for example, the audio processing circuit 200 may directly receive the initial audio data sent by the target device 20, or it may receive the initial audio data sent by an audio collection device, or it may obtain at least one piece of audio data from a preset audio data collection as the initial audio data, or it may also obtain raw audio data. The audio processing circuit 200 may then select the audio data from one channel of the raw audio data as the initial audio data, or the audio processing circuit 200 may include an audio collection circuit. The audio processing circuit 200 can collect audio data through the audio collection circuit and perform analog-to-digital conversion on the collected raw audio data to obtain the initial audio data.

After obtaining the initial audio data, the audio processing circuit 200 can convert the initial audio data into K-channel target audio data, with each channel of target audio data adapted to the audio characteristics of the corresponding sound-producing unit 110. A channel can be understood as a pathway for audio data, and one channel may correspond to one sound-producing unit 110. There are various ways for the audio processing circuit 200 to convert the initial audio data into K-channel of target audio data. For example, the audio processing circuit 200 may duplicate the initial audio data into K channels of initial audio data and then perform spectral adjustment on each channel of the initial audio data, so that the adjusted target audio data is adapted to the audio characteristics of the corresponding sound-producing unit 110.

The audio processing circuit 200 may include a replication circuit that duplicates the initial audio data into K-channel initial audio data. In some exemplary embodiments, the initial audio data can be duplicated into K-channel initial audio data via a processor integrated into the audio processing circuit 200 or through a standalone processor.

The spectrum of the initial audio data may include K frequency bands, where the i-th sound-producing unit 110 among the K sound-producing units 110 has a desired sound effect in the i-th frequency band, with i being any integer in the range [1, K]. For example, if the spectrum of the initial audio data spans [20 Hz, 20 KHz], the K frequency bands could be any frequency band within this spectrum. The K frequency bands may fully cover the entire spectrum or cover pre-set ranges such as high, mid, and low frequencies. These K frequency bands may overlap or be completely independent, and so on.

In some exemplary embodiments, the desired sound effect may be a pre-set sound effect. The sound effect could include concepts related to sound quality desired in the field of music, such as thickness, smoothness, purity, or combinations thereof, or scientific concepts like fidelity exceeding a pre-set value. For instance, fidelity can be understood as the degree of restoration of the target audio compared to the original audio corresponding to the target audio, or it can be understood as the degree of similarity between the target audio and the original audio. The pre-set sound effect can be understood as a sound effect where the audio effect parameters of the reverberated sound emitted by the sound-producing unit meet pre-set audio parameters. The target sound effect can be understood as a specific sound effect that is desired to be achieved. It should be noted here that the i-th sound-producing unit 110 has a desired sound effect in the i-th frequency band, and the desired sound effects in different frequency bands may be the same or different for different sound-producing units 110. Additionally, different sound-producing units 110 may correspond to different frequency bands based on their audio characteristics. These different sound-producing units 110 may have overlapping or non-overlapping frequency bands.

The spectrum adjustment can be understood as adjusting the audio data for different frequency bands of the initial audio data. The audio processing circuit 200 may employ various methods to perform spectrum adjustment on the initial audio data for each channel. For example, for any integer i in the range [1, K], the audio processing circuit 200 may use a spectrum adjustment algorithm to preserve or enhance the amplitude in the i-th frequency band while attenuating the amplitudes in other frequency bands, resulting in the i-th channel target audio. This i-th channel target audio data is adapted to the audio characteristics of the corresponding i-th sound-producing unit 110. Alternatively, the audio processing circuit 200 may use a spectrum adjustment algorithm to retain the audio data in the i-th frequency band and filter out the audio data in other frequency bands, resulting in the i-th channel target audio, which is adapted to the audio characteristics of the corresponding i-th sound-producing unit 110.

The spectrum adjustment algorithm can be understood as a software algorithm for performing spectrum adjustment on the initial audio data. There are various types of spectrum adjustment algorithms, including but not limited to, equalization (EQ), crossover algorithms, and filter algorithms. Additionally, the algorithm parameters of the spectrum adjustment algorithm can be dynamically adjusted according to needs, thereby achieving richer auditory experiences.

Figure 3:
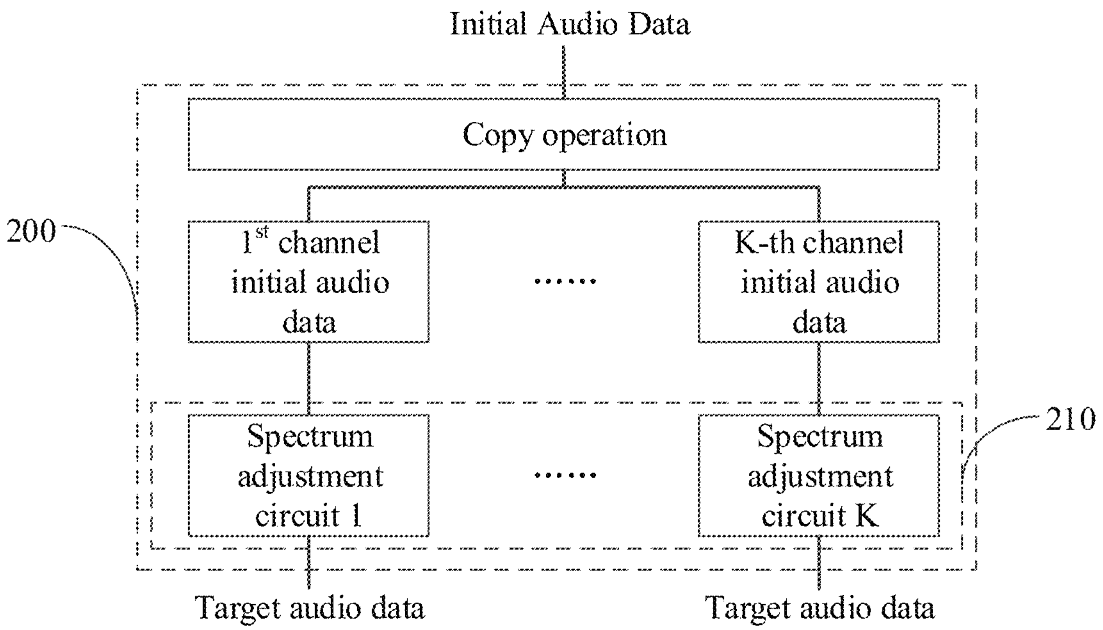
FIG. 3 illustrates a schematic diagram of the structure of an audio processing circuit according to exemplary embodiments of the present disclosure.

In some exemplary embodiments, spectrum adjustment can also be performed via hardware. Therefore, the audio processing circuit 200 may include K spectrum adjustment circuits 210, as shown in FIG. 3, where the i-th spectrum adjustment circuit performs spectrum adjustment on the initial audio data of the i-th channel when in operation. The method of spectrum adjustment is similar to that of the spectrum adjustment algorithm mentioned above, as detailed earlier, and will not be repeated here.

There are various types of spectrum adjustment circuits 210, including but not limited to, crossover circuits and DSP processing circuits.

After the audio processing circuit 200 converts the initial audio data into K-channel target audio data, it can then input the K-channel target audio data into the corresponding K sound-producing units 110. Each sound-producing unit 110 converts the corresponding target audio data into target audio, forming reverberated sound. There are multiple ways for the audio processing circuit 200 to input the K-channel target audio data into the corresponding K sound-producing units 110. For example, the audio processing circuit 200 may directly input the K-channel target audio data into the corresponding K sound-producing units 110, or the audio processing circuit 200 may combine the target audio data of each channel to obtain integrated audio data and then input the integrated audio data into the corresponding K sound-producing units 110.

Figure 4:
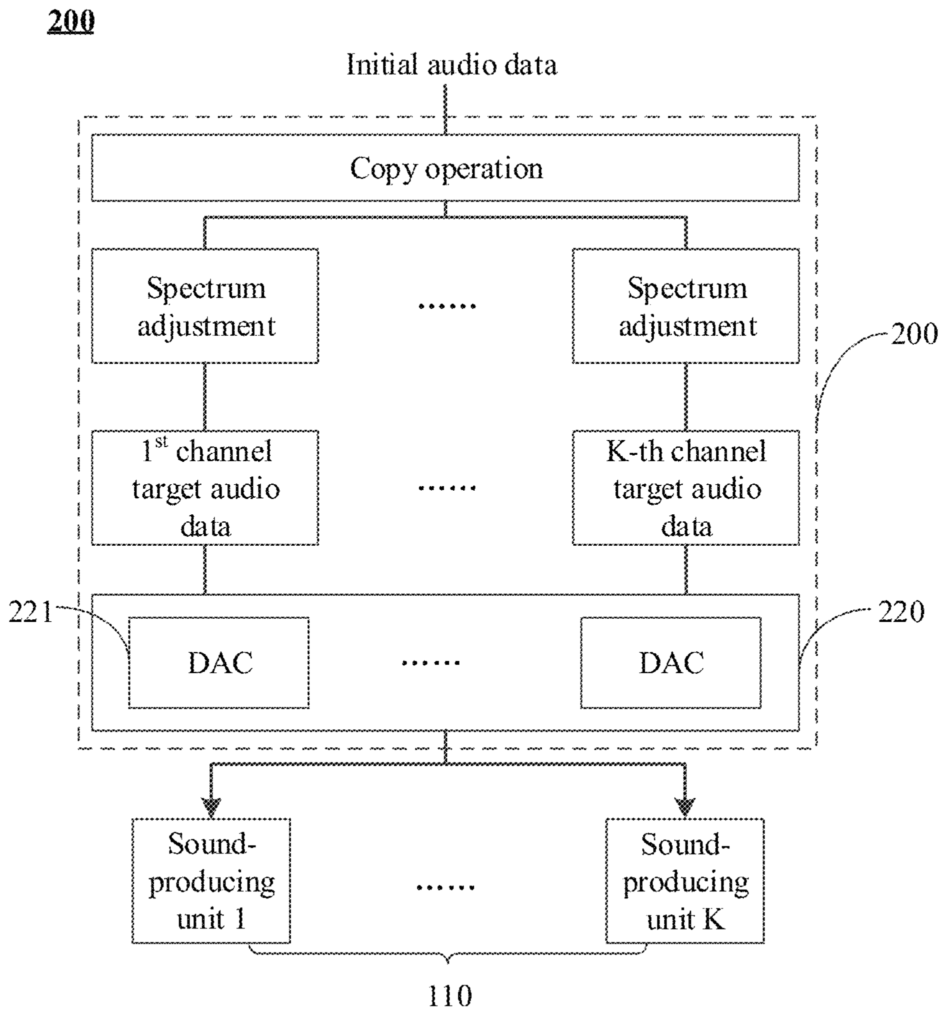
FIG. 4 illustrates another schematic diagram of the structure of an audio processing circuit according to exemplary embodiments of the present disclosure.

As shown in FIG. 4, the audio processing circuit 200 may also include a DAC (Digital-to-Analog Converter) module 220, which may include at least one DAC 221. The audio processing circuit 200 can then input the K-channel target audio data into the corresponding K sound-producing units 110 through the DAC 221 in the DAC module 220. When the DAC module 220 is in operation, it receives the K-channel target audio data, converts the K-channel target audio data into K analog electrical signals, and inputs the K analog electrical signals into the corresponding sound-producing units 110. There can be various correspondence relationships between the DAC 221 in the DAC module 220 and the K sound-producing units, such as one-to-one, one-to-many, or many-to-many, etc.

There are multiple ways for the audio processing circuit 200 to combine the target audio data of each channel, for example, the audio processing circuit 200 can combine the target audio data of each channel into a frame of audio data through a combination operation, thereby obtaining integrated audio data.

The integrated audio data includes K segments of sub-data, where the i-th segment of sub-data includes the target audio data of the i-th channel and the corresponding i-th identifier, with i being any integer in the range [1, K]. Through the i-th identifier, the target audio data corresponding to the i-th channel can be identified in the integrated audio data. Therefore, the digital audio interface 230 or the i-th sound-producing unit 110 can identify the target audio data of the i-th channel based on the i-th identifier.

Figure 5:
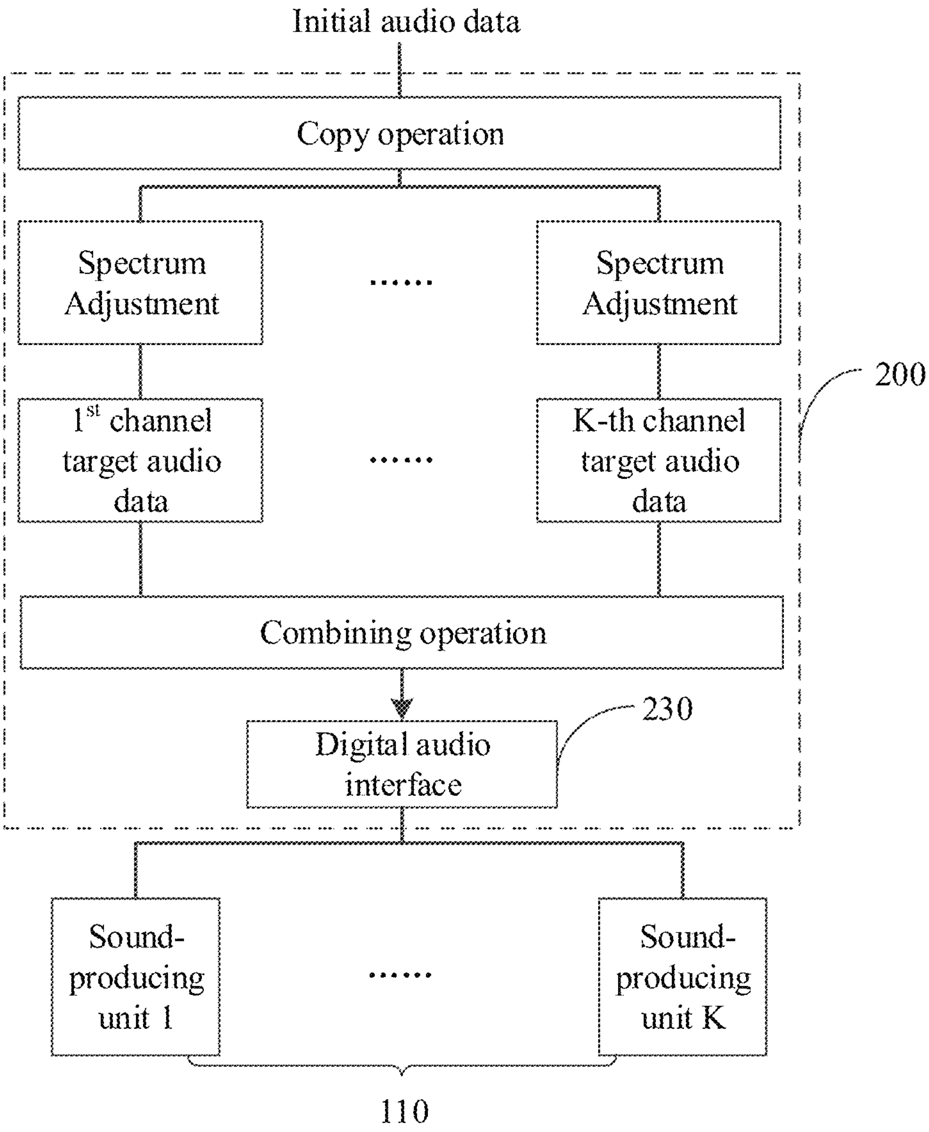
FIG. 5 illustrates yet another schematic diagram of the structure of an audio processing circuit according to exemplary embodiments of the present disclosure.

After combining the target audio data of each channel, the audio processing circuit 200 can then input the combined integrated audio data into the corresponding K sound-producing units 110. Since the integrated audio data is still digital audio data at this point, the audio processing circuit 200 may also include a digital audio interface 230, as shown in FIG. 5. When in operation, the audio processing circuit 200 can input the integrated audio data into the corresponding K sound-producing units through the digital audio interface 230.

There are multiple ways for the audio processing circuit 200 to input the integrated audio data into the corresponding K sound-producing units through the digital audio interface 230. For example, after receiving the integrated audio data, the digital audio interface 230 can directly send the integrated audio data to the corresponding K sound-producing units 110. Each sound-producing unit 110 among the K sound-producing units 110 can identify the corresponding target audio data in the integrated audio data, or the digital audio interface 230 can identify the target audio data corresponding to each sound-producing unit 110 in the integrated audio data and send the target audio data to the corresponding sound-producing unit 110.

Figure 6:
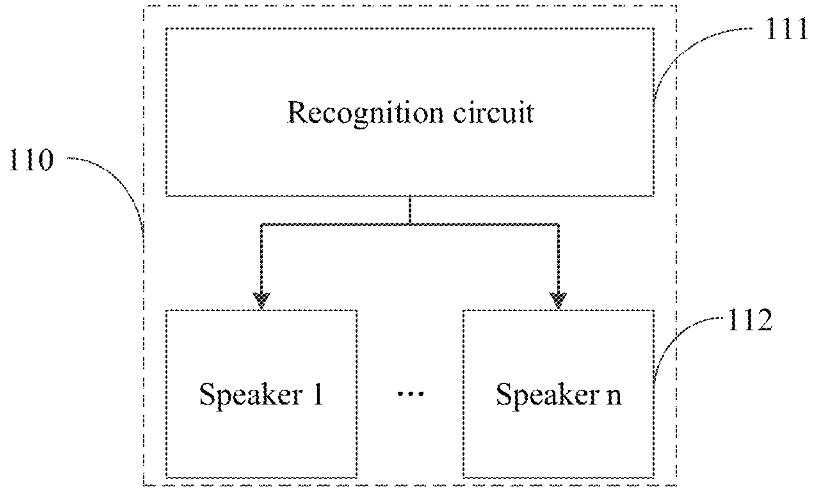
FIG. 6 illustrates a schematic diagram of the structure of a sound-producing unit according to exemplary embodiments of the present disclosure.

The digital audio interface (DAI) 230 can be understood as an interface for transmitting digital audio signals at the board level or between boards. Compared to analog interfaces, the digital audio interface 230 has stronger anti-interference capability and simpler hardware design. There are various types of digital audio interfaces 230, including but not limited to, I2S (a type of digital audio interface), TDM (a type of digital audio interface), PCM (a type of digital audio interface), and PDM (a type of digital audio interface). When the digital audio interface 230 directly sends the integrated audio data to the K sound-producing units 110, each sound-producing unit 110 among the K sound-producing units 110 needs to identify the corresponding target audio data in the integrated audio data. Therefore, the sound-producing unit 110 may also include a recognition circuit 111 and at least one speaker 112, as shown in FIG. 6. When the i-th recognition circuit 111 is in operation, it: receives the integrated audio data, identifies the corresponding i-th identifier in the integrated audio data, filters out the sub-data corresponding to other identifiers, converts the target audio data corresponding to the i-th identifier into the target audio covering the i-th frequency band, and sends the target audio to a speaker 112.

When the digital audio interface 230 identifies the target audio data corresponding to each sound-producing unit 110 in the integrated audio data and sends the target audio data to the corresponding sound-producing unit 110, the digital audio interface 230 needs to have the capability to identify the target audio data corresponding to each sound-producing unit 110. Therefore, the digital audio interface 230 at this point becomes a digital audio interface 230 with recognition and distribution functions. When in operation, the digital audio interface 230: receives the integrated audio data, identifies the identifier corresponding to each sound-producing unit 110 in the integrated audio data, and the target audio data corresponding to that identifier, and sends the target audio data to the corresponding sound-producing unit 110.

After receiving the corresponding target audio data, the K sound-producing units can convert the target audio data into target audio, thereby forming reverberated sound. The target audio can be understood as the sound that is audible to the human ear, while the audio data corresponds to the electrical signal of the sound, or the electrical signal carrying the sound information, which can be a digital signal, an analog electrical signal, etc. After the sound-producing unit 110 converts the target audio data into the target audio, it can send the target audio to at least one speaker 112, which will play the target audio. By playing the corresponding target audio through at least one speaker 112 in the K sound-producing units 110, reverberated sound can be formed.

When the K sound-producing units 110 are operating, they can play the corresponding target audio with the same phase simultaneously, thereby avoiding mutual interference between different target audio in the reverberated sound, which could otherwise affect the sound quality of the reverberated sound.

The K sound-producing units at least include high-frequency, mid-frequency, and low-frequency speakers 112. The high, mid, and low frequencies can be set according to the actual spectrum of the initial audio data. The spectrum of the initial audio data includes K frequency bands, which can cover high, mid, and low frequencies. As previously described, in some application scenarios, low frequency can refer to the frequency band roughly/substantially from 20 Hz to 150 Hz, mid-frequency can refer to the band roughly/substantially from 150 Hz to 5 KHz, and high frequency can refer to the band roughly/substantially from 5 KHz to 20 KHz. Mid-low frequency can refer to the band roughly/substantially from 150 Hz to 500 Hz, and mid-high frequency can refer to the band roughly/substantially from 500 Hz to 5 KHz. Those skilled in the art will understand that the distinctions between these frequency bands are provided as approximate ranges for example purposes. The definition of these frequency bands may vary depending on different industries, application scenarios, and classification standards. For instance, in other application scenarios, low frequency may refer to the band roughly/substantially from 20 Hz to 80 Hz, mid-low frequency may refer to the band roughly/substantially from 80 Hz to 160 Hz, mid-frequency may refer to the band roughly/substantially from 160 Hz to 1280 Hz, mid-high frequency may refer to the band roughly/substantially from 1280 Hz to 2560 Hz, and high frequency may refer to the band roughly/substantially from 2560 Hz to 20 KHz.

There can be various types of speakers 112, such as air speakers and vibration-conducting speakers. The air speaker can be understood as a speaker that outputs air-conducted sound waves, while the vibration-conducting speaker can be understood as a speaker that outputs sound waves conducted through a solid medium (such as bone conduction sound waves). Vibration-conducting speakers and air-conducted speakers can be two separate functional devices or part of a single device that achieves multiple functions. Each of the K sound-producing units 110 may include at least one of the air speaker and the vibration-conducting speaker.

In some exemplary embodiments, the audio processing device 10 may be a headset. There can be various types of headsets, including wired headsets, wireless headsets, or Bluetooth headsets, among others.

In some exemplary embodiments, the audio processing device 10 may also include audio playback devices that perform audio processing, such as hearing aids, speakers, or other audio playback devices.

In some exemplary embodiments, the correspondence between the channels and sound-producing units 110 can be one-to-one, many-to-one, or one-to-many. The one-to-one correspondence means each channel corresponds to one sound-producing unit 110. For example, if there are K sound-producing units 110 and K channels, then the i-th channel can correspond to the i-th sound-producing unit 110, allowing the audio processing circuit 200 or processor 400 to send each channel's target audio data to the corresponding sound-producing unit 110, where i ranges from [1, K]. The many-to-one correspondence means multiple channels correspond to the same sound-producing unit 110. For instance, if there are M channels and N sound-producing units, with M greater than N, then each sound-producing unit 110 can correspond to multiple channels, enabling the audio processing circuit 200 or processor 400 to send the M channels' target audio data to the N sound-producing units 110. The one-to-many correspondence means one channel can correspond to multiple sound-producing units 110. For instance, if there are M channels and N sound-producing units, with M less than N, then each channel can correspond to multiple sound-producing units, allowing the audio processing circuit 200 or processor 400 to send the M channels' target audio data to the N sound-producing units 110.

In some exemplary embodiments, if at least one of the K sound-producing units 110 undergoes a change or receives a sound effect adjustment request, the audio processing circuit 200 adjusts the correspondence between the channels and the sound-producing units. Changes in the sound-producing unit 110 can include various situations, such as sound-producing failure, abnormal operation, or changes in sound performance (e.g., the sound-producing unit changes from bone conduction to air conduction, etc.), among others. The sound effect adjustment request could be a request to adjust the sound effect of the currently playing audio. The sound effect can be the playback effect of the currently playing audio, and there can be various types of sound effects, such as heavy metal, light music, electronic music, classical, pop music, or jazz, among others. When at least one of the K sound-producing units 110 undergoes a change or receives a sound effect adjustment request, the audio processing circuit 200 or processor 400 can adjust the correspondence between the channels and the sound-producing units. There are various ways to adjust the correspondence between the channels and the sound-producing units. For example, adjustments can be made within the same type of correspondence, or the correspondence can be adjusted to a different type. Adjusting within the same type of correspondence refers to making adjustments without changing the type of correspondence itself. For instance, if the correspondence is one-to-one, the i-th channel originally corresponding to the i-th sound-producing unit can be adjusted to correspond to the n-th sound-producing unit. Adjusting to a different type of correspondence refers to changing the current correspondence to another type. For instance, if the current correspondence between channels and sound-producing units 110 is one-to-one, the audio processing circuit 200 or processor 400 can adjust this to a many-to-one or one-to-many correspondence. After adjustment, the sound-producing units 110 corresponding to each channel may remain the same or change. For example, if the current correspondence is one-to-one, and after adjustment, it changes to many-to-one, then before adjustment, the i-th channel corresponds to the i-th sound-producing unit 110, and the i+1-th channel corresponds to the i+1-th sound-producing unit 110, but after adjustment, the i-th channel may correspond to the i-th sound-producing unit 110, and the i+1-th channel may also correspond to the i-th sound-producing unit 110, and so on.

In the description above, the audio processing circuit 200 in the audio processing device 10, along with other electronic components that work in conjunction with it, such as the DAC, spectrum adjustment devices, etc., can all be circuits or electronic components integrated on one or more circuit boards, electrically connected to each other. The audio processing device 10 can also include a processor and storage medium, and the processor can perform all or part of the functions of the audio processing circuit 200 and some electronic components.

Figure 7:
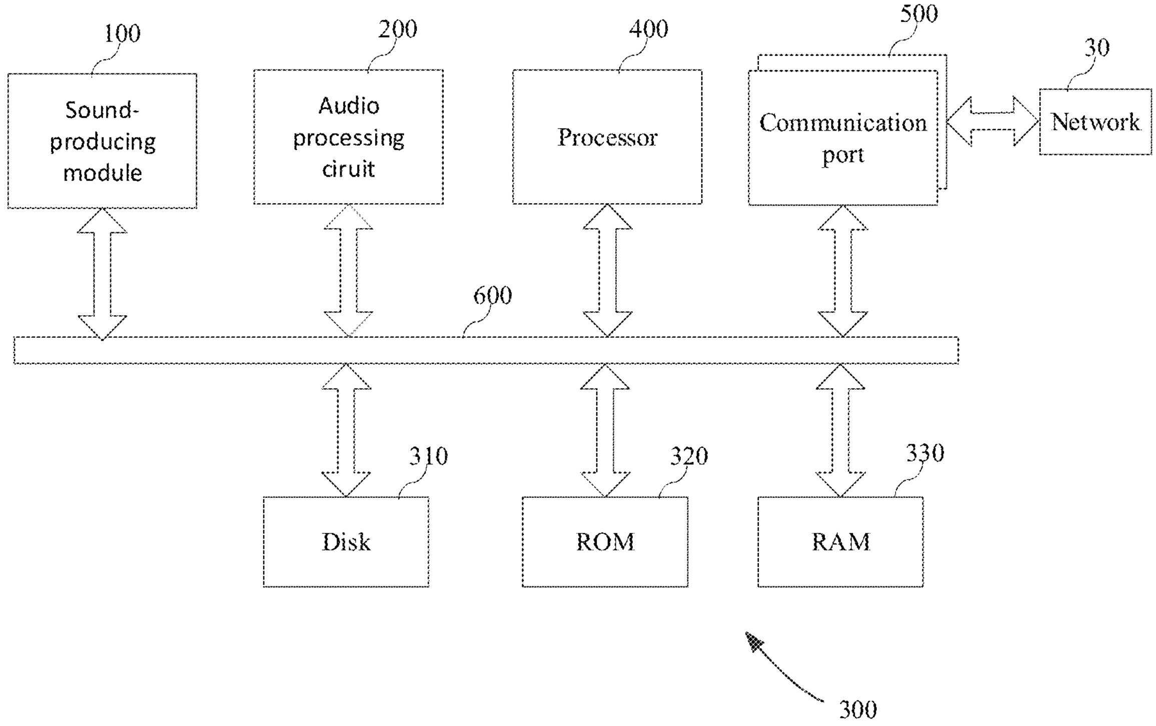
FIG. 7 illustrates a schematic diagram of an audio processing system device according to exemplary embodiments of the present disclosure.

FIG. 7 illustrates a schematic diagram of an audio processing system 001 (hereinafter referred to as system 001) according to some exemplary embodiments of this application. In addition to the hardware described earlier, the audio processing device 10 may also include at least one storage medium 300 and at least one processor 400. To meet internal and external communication needs, the audio processing device 10 may also include a communication port 500 and an internal communication bus 600.

The internal communication bus 600 can connect different system components, including the storage medium 300, processor 400, and communication port 500.

The audio processing device 10 can communicate data with external systems through the communication port 500. For instance, the audio processing device 10 can obtain initial audio data from the target device 20 through the communication port 500.

The at least one storage medium 300 may include a data storage device. The data storage device can be non-transitory storage media or transitory storage media. For example, the data storage device can include one or more of a disk, read-only memory (ROM), or random-access memory (RAM). When the audio processing device 10 is operating, the storage medium 300 may also include at least one set of instructions stored in the data storage device, used to obtain the initial audio data and process the initial audio data. The instructions may be computer program code, which may include programs, routines, objects, components, data structures, processes, modules, etc., for performing the audio processing method provided by the present disclosure.

The at least one processor 400 can be communicatively connected with the at least one storage medium 300 through the internal communication bus 600. The communication connection refers to any form of connection that can directly or indirectly receive information. The at least one processor 400 is used to execute the at least one instruction set. When the audio processing device 10 is operating, the at least one processor 400 reads the at least one instruction set and executes the audio processing method provided by the present disclosure based on the instructions in the at least one instruction set. The processor 400 can perform all the steps contained in the audio processing method. The processor 242 can be in the form of one or more processors. In some exemplary embodiments, the processor 242 may include one or more hardware processors, such as microcontrollers, microprocessors, Reduced Instruction Set Computing (RISC) processors, Application-Specific Integrated Circuits (ASICs), Application-Specific Instruction Set Processors (ASIPs), Central Processing Units (CPUs), Graphics Processing Units (GPUs), Physics Processing Units (PPUs), microcontroller units, Digital Signal Processors (DSPs), Field-Programmable Gate Arrays (FPGAs), Advanced RISC Machines (ARMs), Programmable Logic Devices (PLDs), or any circuits or processors capable of executing one or more functions, or any combination thereof.

For illustration purposes only, the present disclosure describes audio processing device 10 with a single processor 400. However, it should be noted that audio processing device 10 may also include multiple processors 400, and thus, the operations and/or method steps disclosed in the present disclosure can be performed by a single processor as described or by multiple processors in combination. For example, if the processor 400 of audio processing device 10 is said to execute step A and step B in the present disclosure, it should be understood that step A and step B can also be executed by two different processors 400 either jointly or separately (e.g., the first processor executes step A, and the second processor executes step B, or both the first and second processors jointly execute steps A and B).

In some exemplary embodiments, when audio processing device 10 processes initial audio data, all the audio processing steps can be executed by the audio processing circuit 200, or they can be completed by the audio processing circuit 200 in combination with the storage medium 300 and the processor 400.

The ways in which the audio processing circuit 200 executes all the audio processing steps can vary. For example, the audio processing circuit 200 may acquire audio data, convert the initial audio data into K-channel target audio data, where each channel's target audio data is adapted to the corresponding sound-producing unit's audio characteristics, and then input the K-channel target audio data to the corresponding K sound-producing units 110. Each sound-producing unit will then convert the corresponding target audio data into the target audio, creating reverberated sound.

The steps in which the audio processing circuit 200, storage medium 300, and processor 400 together complete the audio processing can also vary. For example, the audio processing circuit 200 or processor 400 may obtain the initial audio data, and the processor 400 may retrieve control instructions from the storage medium 300. Based on these control instructions, it performs a copying operation to replicate the initial audio data into K channels of initial audio data. It then applies a spectrum adjustment algorithm to the K channels of initial audio data, resulting in target audio data for each channel. The processor 400 sends the target audio data to the DAC module 220 in the audio processing circuit 200. After receiving the target audio data for each channel, the DAC module 220 converts the target audio data into analog electrical signals and sends these analog signals to the corresponding sound-producing units 110. Each sound-producing unit converts the corresponding target audio data into target audio, forming reverberated sound. Alternatively, the audio processing circuit 200 or processor 400 may obtain the initial audio data, retrieve control instructions from the storage medium 300, perform a copying operation to replicate the initial audio data into K channels, and apply a spectrum adjustment algorithm to obtain the target audio data for each channel. The processor 400 then combines the target audio data from each channel to create integrated audio data and sends this integrated audio data to the digital audio interface 230 in the audio processing circuit 200. The digital audio interface 230 directly sends the integrated audio data to each sound-producing unit 110. Each sound-producing unit 110 identifies its corresponding target audio data within the integrated audio data and converts it into target audio, forming reverberated sound. Alternatively, the audio processing circuit 200 or processor 400 may obtain the initial audio data, retrieve control instructions from the storage medium 300, perform a copying operation to replicate the initial audio data into K channels, apply a spectrum adjustment algorithm to obtain the target audio data for each channel, combine the target audio data into integrated audio data, and send the integrated audio data to the digital audio interface 230 in the audio processing circuit 200. The digital audio interface 230 then identifies the target audio data corresponding to each sound-producing unit 110 within the integrated audio data and sends the target audio data to the corresponding sound-producing unit 110. Each sound-producing unit 110 converts the corresponding target audio data into target audio, forming reverberated sound, and so on.

The following describes the audio processing method for headphones.

Figure 8:
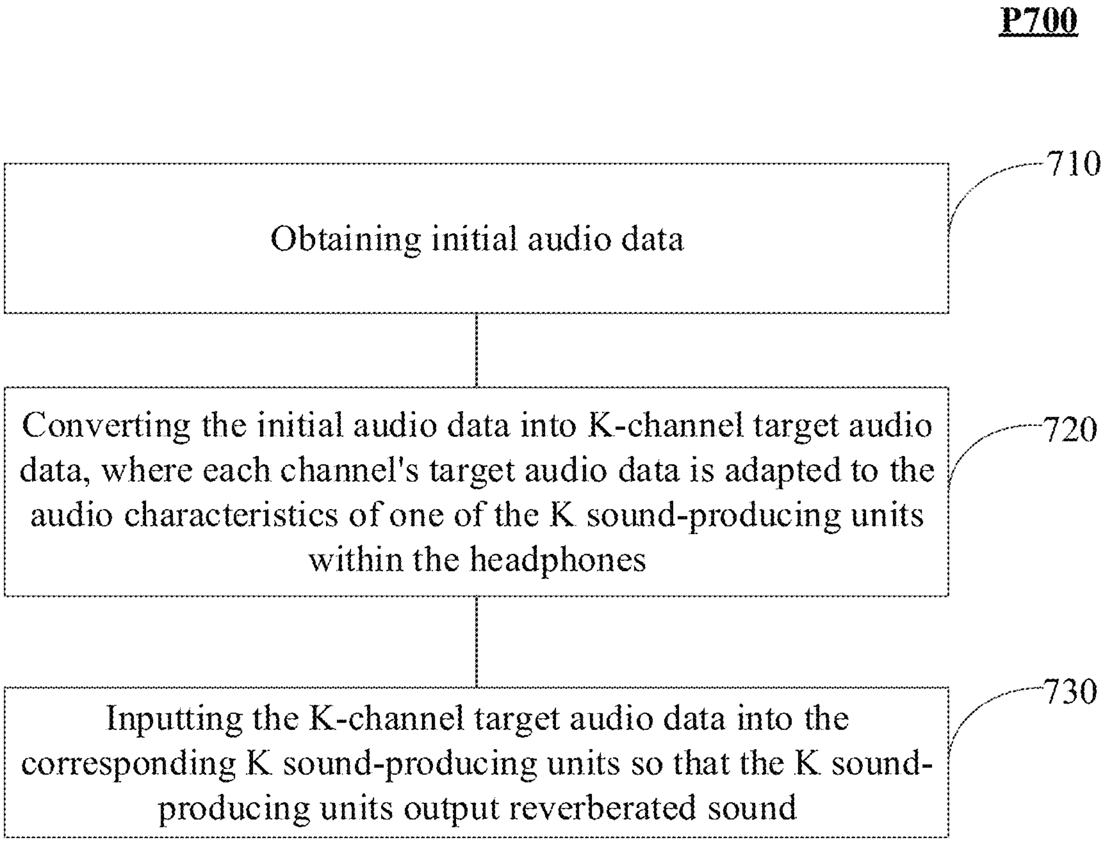
FIG. 8 illustrates a flowchart of an audio processing method according to exemplary embodiments of the present disclosure.

FIG. 8 illustrates a flowchart of the audio processing method for headphones according to exemplary embodiments of the present disclosure. The audio processing device 10 can execute the audio processing method P700 described in the present disclosure. Specifically, the audio processing circuit 200 and/or processor 400 in the audio processing device 10 can read the instruction set stored in the local storage medium and then execute the audio processing method P700 described in the present disclosure according to the instructions in the instruction set. As shown in FIG. 8, method P700 may include:

S710: Obtaining initial audio data.

For example, the audio processing circuit 200 or processor 400 can obtain the initial audio data. The method for obtaining the initial audio data can refer to the description provided earlier, and will not be reiterated here.

S720: Converting the initial audio data into K-channel target audio data, where each channel's target audio data is adapted to the audio characteristics of one of the K sound-producing units within the headphones.

For example, the audio processing circuit 200 or processor 400 can duplicate the initial audio data into K channels of initial audio data and perform spectrum adjustment for each channel so that the adjusted target audio data is adapted to the audio characteristics of one of the K sound-producing units 110 within the headphones.

The initial audio data includes K frequency bands; details can be found in the previous descriptions. The i-th sound-producing unit in the K sound-producing units 110 has the desired sound effect in the i-th frequency band. The desired sound effect can refer to the earlier description and will not be reiterated here.

There are various ways to perform spectrum adjustment on each channel's initial audio data to ensure that the adjusted target audio data is adapted to the audio characteristics of one of the K sound-producing units 110 within the headphones. For instance, the audio processing circuit 200 or processor 400 may use a spectrum adjustment algorithm to perform spectrum adjustment on the initial audio data of each channel. Specific adjustment methods may include retaining or enhancing the amplitude in the i-th frequency band and attenuating the amplitude in other frequency bands to obtain the target audio data for the i-th channel. This target audio data is adapted to the audio characteristics of the corresponding sound-producing unit 110 in the i-th channel of the headphones. Alternatively, the i-th channel's initial audio data may retain the audio data in the i-th frequency band while filtering out the audio data in other frequency bands to obtain the target audio data for the i-th channel. This target audio data is adapted to the audio characteristics of the corresponding sound-producing unit 110 in the i-th channel of the headphones. Additionally, the audio processing circuit 200 may use spectrum adjustment circuit 210 to perform spectrum adjustment on each channel's initial audio data. The specific adjustment method is similar to the method using the spectrum adjustment algorithm as previously described and will not be reiterated here.

The types of spectrum adjustment algorithms can vary, as detailed in the previous descriptions, and will not be reiterated here.

S730: Inputting the K-channel target audio data into the corresponding K sound-producing units so that the K sound-producing units output reverberated sound.

Each sound-producing unit 110 has different audio characteristics.

There are various ways to input the K-channel target audio data into the corresponding K sound-producing units 110 so that the K sound-producing units 110 output reverberated sound. Specific methods may include:

For example, the audio processing circuit 200 or processor 400 can use DAC module 220 to convert each channel's target audio data into an analog electrical signal and input the analog electrical signals into the corresponding sound-producing units 110 so that each sound-producing unit converts the corresponding analog electrical signal into the target audio, forming reverberated sound. Alternatively, the target audio data for each channel can be combined into integrated audio data, which is then input into the corresponding sound-producing units 110 through the digital audio interface 230 so that the K sound-producing units 110 output reverberated sound. For specific processes, refer to the previous descriptions, and they will not be reiterated here.

Figure 9:
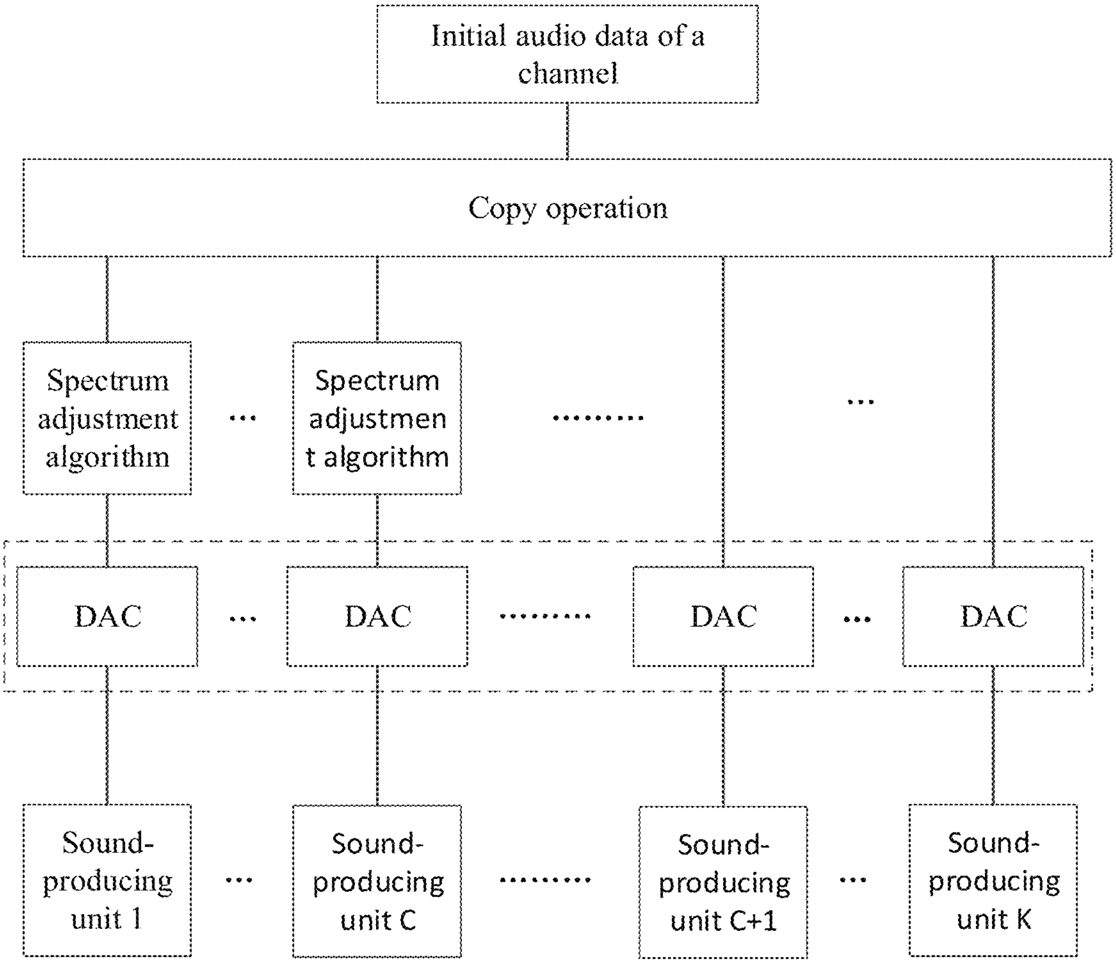
FIG. 9 illustrates a flowchart of an audio processing method using a DAC module according to exemplary embodiments of the present disclosure.
Figure 10:
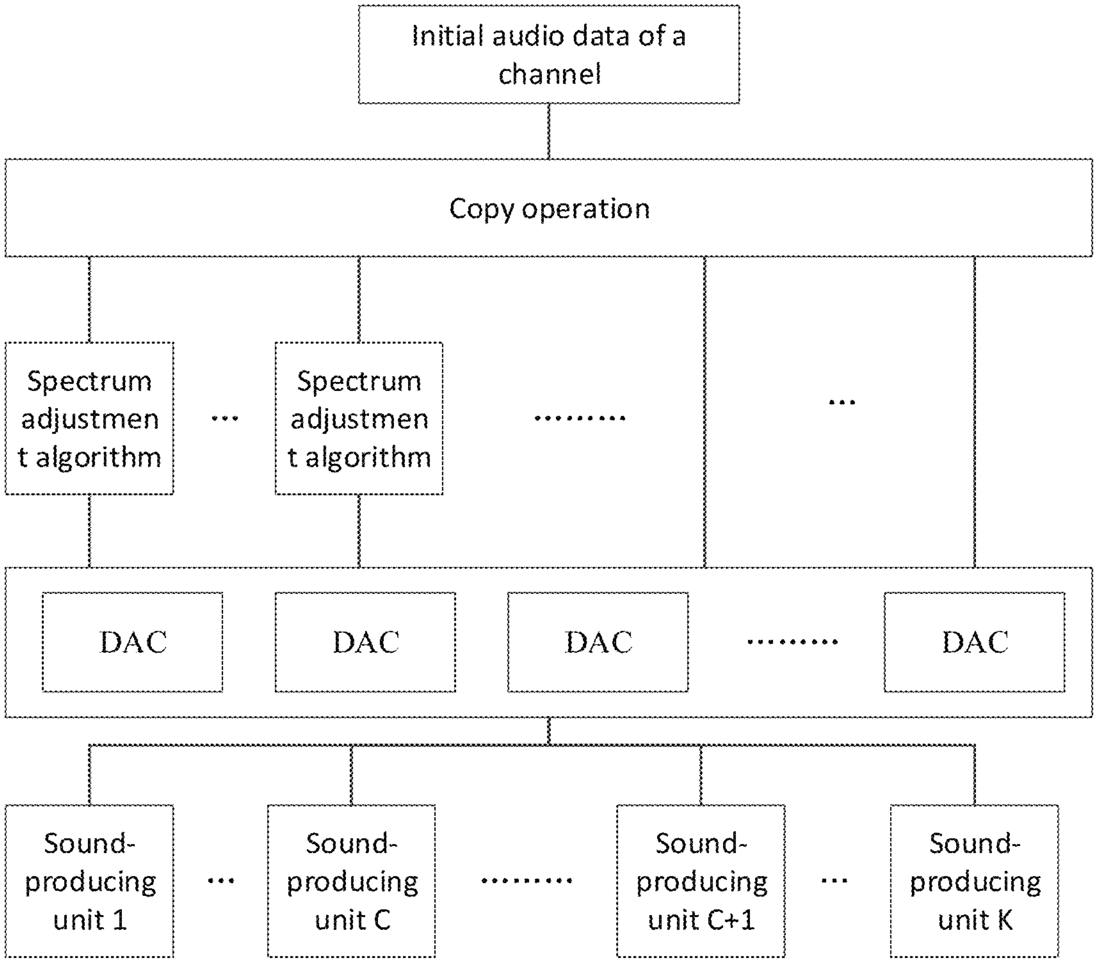
FIG. 10 illustrates another flowchart of an audio processing method using a DAC module according to exemplary embodiments of the present disclosure.

For example, if the audio processing device 10 is a pair of headphones, the headphones may include at least one of an air-conducting sound-producing unit, a bone-conducting sound-producing unit, or other types of sound-producing units. If another type of sound-producing unit has the desired sound effect across the entire audio spectrum, spectrum adjustment of the initial audio data may not be necessary. Thus, for initial audio data that is a single-channel of initial audio data, where C sound-producing units in the K sound-producing units 110 correspond to initial audio data that requires spectrum adjustment and the other (K-C) sound-producing units 110 do not require spectrum adjustment, the process of the audio processing method may be as shown in FIGS. 9, 10, and 11, and can be specifically as follows:

FIG. 9 illustrates a flowchart of the audio processing method using DAC module 220. In FIG. 9, the audio processing circuit 200 or processor 400 duplicates a single-channel of initial audio data into K channels of corresponding initial audio data and uses a spectrum adjustment algorithm to adjust the initial audio data of C channels. For a one-to-one correspondence between channels and sound-producing units 110, each channel corresponds to one DAC 221, and each DAC 221 corresponds to one sound-producing unit 110. The C channels of target audio data that were spectrum adjusted can be input into the corresponding sound-producing units 110 (1C) through the corresponding DACs 221 in the DAC module 220. Then, the initial audio data of the remaining (K-C) channels, which did not undergo spectrum adjustment, can be input into the corresponding sound-producing units 110 (C+1K) as target audio data. The K sound-producing units 110 can then convert the received target audio data into target audio and play it through at least one speaker in the sound-producing unit, forming reverberated sound. The specific process can refer to the previous descriptions and will not be reiterated here.

It is important to note that the correspondence between channels and sound-producing units can also include many-to-one and one-to-many relationships. Therefore, the relationship between DACs 221 in DAC module 220 and sound-producing units 110 may not necessarily be one-to-one. In this case, DACs 221 in DAC module 220 can be considered as a whole, as shown in FIG. 10. At this point, the audio processing circuit 200 or processor 400 can manage and send the target audio data to the sound-producing units 110 through the DAC module 220 as a whole. Consequently, the DACs 221 in the DAC module 220 can adaptively send the corresponding target audio data to the sound-producing units 110 based on the performance of the sound-producing units. For instance, if sound-producing unit m has better performance for the target audio data of channel n that has been spectrum adjusted, the audio processing circuit 200 or processor 400 can send the target audio data of channel n to sound-producing unit m, where m is any integer from [1,K], and n is any integer from [1,C]. Additionally, DACs 221 in DAC module 220 can switch the input of target audio data for one or multiple channels to different sound-producing units. For instance, if the target audio data of channel i currently corresponds to sound-producing unit i, but due to a change in performance, sound failure, or receipt of a sound effect adjustment request, the target audio data of channel i can be sent to another sound-producing unit with the preset sound performance, allowing the other sound-producing unit to continue playing based on the target audio data, where i is any integer from [1,K]. If the other sound-producing unit also has corresponding target audio data, the current target audio data can be discarded, or the two target audio data streams can be merged and played based on the merged audio data, and so on. The DACs 221 in DAC module 220 can also switch the target audio data of multiple channels to the same sound-producing unit. For example, the audio processing circuit 200 or processor 400 can input the target audio data of channel i and channel (i+1) into the same sound-producing unit i through one or more DACs 221 in DAC module 220, where i is any integer from [1,K], and so on. The DACs 221 in DAC module 220 can also switch the target audio data of a single channel to multiple sound-producing units. For example, the audio processing circuit 200 or processor 400 can send the target audio data of channel i to multiple sound-producing units through one or more DACs 221 in DAC module 220**, where i is any integer from [1,K].

Figure 11:
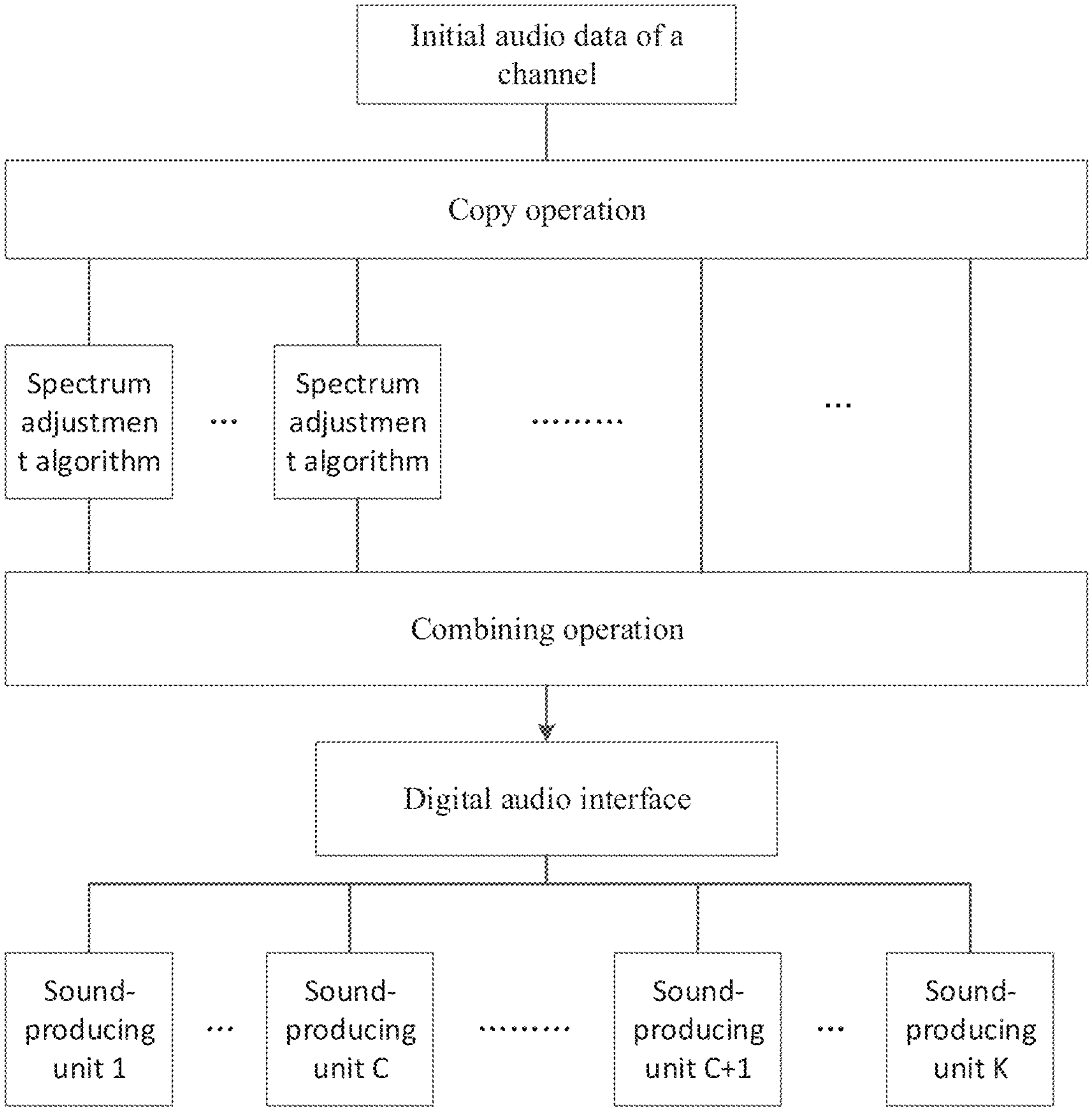
FIG. 11 illustrates a flowchart of an audio processing method using a digital audio interface according to exemplary embodiments of the present disclosure.

FIG. 11 illustrates a flowchart of the audio processing method using a digital audio interface 230. In FIG. 11, the audio processing circuit 200 or processor 400 duplicates a single-channel of initial audio data into K channels of corresponding initial audio data and uses a spectrum adjustment algorithm to adjust the initial audio data of the C channels. The target audio data for these C channels after spectrum adjustment, along with the unprocessed initial audio data for the remaining (K-C) channels, are combined to form integrated audio data. The integrated audio data is then input into the K sound-producing units 110 through the digital audio interface 230, allowing the K sound-producing units to obtain the corresponding target audio data. The target audio data is then converted into the target audio and played through at least one speaker within the sound-producing unit, thereby forming reverberated sound. The specific process can refer to the earlier descriptions and will not be reiterated here.

This audio processing method flow achieves the distribution of audio data from one channel to multiple channels, with each channel's initial audio data being individually adjusted to match the audio characteristics of different sound-producing units 110. Additionally, when using the spectrum adjustment algorithm to adjust the initial audio data, the parameters of the spectrum adjustment algorithm can be dynamically adjusted, resulting in a richer auditory experience.

In summary, the audio processing device and audio processing method provided in the present disclosure include an audio processing device with a sound-producing module and an audio processing circuit. The sound-producing module includes K sound-producing units, each with different audio characteristics, where K is an integer greater than one. After obtaining the initial audio data, the audio processing circuit converts the initial audio data into K-channel target audio data. Each channel's target audio data is adapted to the audio characteristics of the corresponding sound-producing unit, and the K-channel target audio data is input into the corresponding K sound-producing units. Each sound-producing unit converts the corresponding target audio data into the target audio, forming reverberated sound. This approach allows the audio processing circuit to convert the initial audio data into K-channel target audio data and input it into the corresponding K sound-producing units, with each channel's target audio data tailored to the audio characteristics of the corresponding sound-producing unit. This ensures that the sound produced by each sound-producing unit in the sound-producing module achieves optimal sound quality, thereby enhancing the audio quality of the audio processing.

On the other hand, the present disclosure provides a non-transitory storage medium storing at least one set of executable instructions for audio processing. When the executable instructions are executed by a processor, the executable instructions instruct the processor to implement the steps of the audio processing method P700 described in the present disclosure. In some possible implementations, various aspects of the present disclosure can also be implemented in the form of a program product, which includes a program code. When the program product is run on an audio processing device 10, the program code is used to enable the audio processing device 10 to perform the steps of the audio processing method P700 described in the present disclosure. The program product for implementing the above method can use a portable compact disk read-only memory (CD-ROM) to include program code and can be run on the audio processing device 10. However, the program product of the present disclosure is not limited to this. In the present disclosure, the readable storage medium can be any tangible medium containing or storing a program, which can be used by or in combination with an instruction execution system. The program product can use any combination of one or more readable media. The readable medium can be a readable signal medium or a readable storage medium. The readable storage medium can be, for example, but not limited to, an electrical, magnetic, optical, electromagnetic, infrared, or semiconductor system, device or device, or any combination of the above. More specific examples of readable storage media include: an electrical connection with one or more conductors, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. The computer-readable storage medium may include a data signal propagated in a baseband or as part of a carrier wave, in which a readable program code is carried. Such propagated data signals may take a variety of forms, including but not limited to electromagnetic signals, optical signals, or any suitable combination of the above. The readable storage medium may also be any readable medium other than a readable storage medium, which may send, propagate, or transmit a program for use by or in conjunction with an instruction execution system, device, or device. The program code contained on the readable storage medium may be transmitted using any suitable medium, including but not limited to wireless, wired, optical cable, RF, etc., or any suitable combination of the above. Program code for performing the operations of the present disclosure may be written in any combination of one or more programming languages, including object-oriented programming languages such as Java, C++, etc., and conventional procedural programming languages such as "C" language or similar programming languages. The program code may be executed entirely on the audio processing device 10, partially on the audio processing device 10, as a separate software package, partially on the audio processing device 10, partially on a remote computing device, or entirely on a remote computing device.

Some exemplary embodiments of the present disclosure are described above. Other exemplary embodiments are within the scope of the appended claims. In some cases, the actions or steps described in the claims may be performed in an order different from that in the exemplary embodiments and still achieve the desired results. In addition, the processes depicted in the drawings do not necessarily require a particular order or sequential order to be shown to achieve the desired results. In some exemplary embodiments, multitasking and parallel processing are also possible or may be advantageous.

In summary, after reading this detailed disclosure, a person skilled in the art may understand that the foregoing detailed disclosure may be presented only by way of example and may not be limiting. Although not explicitly stated here, those skilled in the art will understand that the present disclosure requires various reasonable changes, improvements and modifications to the exemplary embodiments. These changes, improvements and modifications are intended to be proposed by the present disclosure and are within the spirit and scope of the exemplary embodiments of the present disclosure.

In addition, certain terms in the present disclosure have been used to describe the exemplary embodiments of the present disclosure. For example, "one embodiment", "embodiment" and/or "some exemplary embodiments" mean that a specific feature, structure or characteristic described in conjunction with the embodiment may be included in at least one embodiment of the present disclosure. Therefore, it can be emphasized and should be understood that two or more references to "embodiment" or "one embodiment" or "alternative embodiment" in various parts of the present disclosure do not necessarily refer to the same embodiment. In addition, specific features, structures or characteristics may be appropriately combined in one or more exemplary embodiments of the present disclosure.

It should be understood that in the foregoing description of the exemplary embodiments of the present disclosure, in order to help understand a feature, for the purpose of simplifying the present disclosure, the present disclosure combines various features in a single embodiment, figure or description thereof. However, this does not mean that the combination of these features is necessary, and it is entirely possible for those skilled in the art to mark out a part of the equipment as a separate embodiment when reading the present disclosure. That is to say, the exemplary embodiments in the present disclosure can also be understood as the integration of multiple secondary exemplary embodiments. The content of each secondary embodiment is also established when it is less than all the features of a single previous disclosed embodiment.

Each patent, patent application, publication of patent application and other materials, such as articles, books, specifications, publications, documents, articles, etc., cited herein can be incorporated by reference. For all purposes, the entire content, except any prosecution document history related thereto, any identical prosecution document history that may be inconsistent or conflicting with this document, or any identical prosecution document history that may have a limiting effect on the broadest scope of the claims. Now or later associated with this document. For example, if there is any inconsistency or conflict between the description, definition and/or use of terms associated with any included material and the terms, description, definition and/or related to this document, the term in this document shall prevail.

Finally, it should be understood that the exemplary embodiments of the application disclosed herein are illustrative of the principles of the exemplary embodiments of the present disclosure. Other modified exemplary embodiments are also within the scope of the present disclosure. Therefore, the exemplary embodiments disclosed in the present disclosure are only for example and not for limitation. Those skilled in the art can adopt alternative configurations according to the exemplary embodiments in the present disclosure to implement the application in the present disclosure. Therefore, the exemplary embodiments of the present disclosure are not limited to the exemplary embodiments that are precisely described in the application.

What is claimed is:

1. An audio processing device, comprising:

a sound-producing module, including K sound-producing units, each having different audio characteristics, wherein K is an integer greater than one; and an audio processing circuit, configured to:

obtain initial audio data, convert the initial audio data into K-channel target audio data, with each channel's target audio data adapted to audio characteristics of the corresponding sound-producing unit, wherein to convert the initial audio data into K-channel target audio data, the audio processing circuit is configured to:

copy the initial audio data into K-channel of initial audio data; and perform spectral adjustment on the initial audio data for each channel, so that the adjusted target audio data is adapted to the audio characteristics of the corresponding sound-producing unit, and input the K-channel target audio data into the corresponding K sound-producing units, causing each sound-producing unit to convert the corresponding target audio data into target audio, forming reverberated sound.

2. The audio processing device according to claim 1, wherein the initial audio data includes K frequency bands; and the i-th sound-producing unit in the K sound-producing units has a desired sound effect in the i-th frequency band, wherein i is any integer in [1, K], wherein, to perform spectral adjustment on the initial audio data for each channel, so that the adjusted target audio data is adapted to the audio characteristics of the corresponding sound-producing unit, the audio processing circuit is configured to:

for the i-th channel of initial audio data, retain or enhance the amplitude in the i-th frequency band while attenuating the amplitude in other frequency bands, thereby obtaining the i-th channel target audio data, wherein the i-th channel target audio data is adapted to the audio characteristics of the sound-producing unit corresponding to the i-th channel.

3. The audio processing device according to claim 2, wherein the desired sound effect includes at least one of:

a fidelity exceeding a preset value, a preset sound effect, or a target sound effect.

4. The audio processing device according to claim 2, wherein to perform spectral adjustment on the initial audio data for each channel, the audio processing circuit is configured to:

retain the audio data in the i-th frequency band for the i-th channel initial audio data, and filter out the audio data in other frequency bands, thereby obtaining the i-th channel target audio data, wherein the i-th channel target audio data is adapted to the audio characteristics of the sound-producing unit corresponding to the i-th channel.

5. The audio processing device according to claim 2, wherein the audio processing circuit further includes K spectral adjustment circuits, wherein the i-th spectral adjustment circuit performs the spectral adjustment on the i-th channel initial audio data when in operation.

6. The audio processing device according to claim 2, wherein the sound-producing units at least include a high-frequency speaker, a mid-frequency speaker, and a low-frequency speaker, and the K frequency bands cover the high-frequency, mid-frequency, and low-frequency ranges.

7. The audio processing device according to claim 1, wherein the audio processing circuit further includes a DAC module, wherein, during operation, the DAC module is configured to:

receive the K-channel target audio data;

convert the K-channel target audio data into K-channel analog electrical signals; and input the K-channel analog electrical signals into the corresponding sound-producing units.

8. The audio processing device according to claim 1, wherein to input the K-channel target audio data into the corresponding K sound-producing units, the audio processing circuit is configured to:

combine the target audio data for each channel to obtain integrated audio data; and input the integrated audio data into the corresponding K sound-producing units.

9. The audio processing device according to claim 8, wherein the integrated audio data includes K sub-data segments, wherein the i-th sub-data segment includes the i-th channel target audio data and a corresponding i-th identifier, where i is any integer in [1, K].

10. The audio processing device according to claim 8, wherein the audio processing circuit further includes a digital audio interface, and inputs the integrated audio data into the corresponding K sound-producing units through the digital audio interface during operation, wherein each of the K sound-producing units includes a recognition circuit and at least one speaker, and during operation the i-th recognition circuit:

receives the integrated audio data, identifies the corresponding i-th identifier in the integrated audio data, filters out sub-data corresponding to other identifiers, and converts the target audio data corresponding to the i-th identifier into target audio covering the i-th frequency band, and sends the target audio to the at least one speaker.

11. The audio processing device according to claim 8, wherein the audio processing circuit further includes a digital audio interface, during operation, the digital audio interface:

receives the integrated audio data;

identifies each sound-producing unit's corresponding identifier and the target audio data corresponding to that identifier in the integrated audio data; and sends the target audio data to the corresponding sound-producing unit.

12. The audio processing device according to claim 1, wherein the K sound-producing units operate in the same phase while simultaneously playing the corresponding target audio.

13. The audio processing device according to claim 1, wherein the audio processing device is a headset.

14. The audio processing device according to claim 1, wherein the correspondence between the channels and the sound-producing units includes one-to-one, many-to-one, or one-to-many relationships.

15. The audio processing device according to claim 1, wherein when at least one sound-producing unit among the K sound-producing units undergoes a change or receives a sound effect adjustment request, the audio processing circuit adjusts the correspondence between the channels and the sound-producing units.

16. An audio processing method for a headset, comprising, by the audio processing circuit of the headset:

obtaining initial audio data;

converting the initial audio data into K-channel target audio data, with each channel's target audio data adapted to audio characteristics of one of the corresponding K sound-producing units within the headset, where K is an integer greater than one, and each sound-producing unit has different audio characteristics, wherein the converting of the initial audio data into K-channel target audio data includes:

copying the initial audio data into K-channel initial audio data; and performing spectral adjustment on the initial audio data for each channel, so that the adjusted target audio data is adapted to the audio characteristics of one of the corresponding K sound-producing units within the headset; and inputting the K-channel target audio data into the corresponding K sound-producing units, so that the K sound-producing units output reverberated sound.

17. The audio processing method according to claim 16, wherein:

the initial audio data includes K frequency bands; and the i-th sound-producing unit in the K sound-producing units has a desired sound effect in the i-th frequency band, where i is any integer in [1, K], wherein, the spectral adjustment on the initial audio data for each channel includes:

for the i-th channel initial audio data, retaining or enhancing the amplitude in the i-th frequency band while attenuating the amplitude in other frequency bands, thereby obtaining the i-th channel target audio data, wherein the i-th channel target audio data is adapted to the audio characteristics of the sound-producing unit corresponding to the i-th channel.

18. The audio processing method according to claim 17, wherein the spectral adjustment on the initial audio data for each channel includes:

retaining the audio data in the i-th frequency band for the initial audio data of the i-th channel, and filtering out the audio data in other frequency bands, thereby obtaining the target audio data for the i-th channel, which is adapted to the audio characteristics of the sound-producing unit corresponding to the i-th channel.

* * * * *